United States Patent
Nagasaka et al.

(10) Patent No.: US 9,561,722 B2
(45) Date of Patent: Feb. 7, 2017

(54) DISPLAY DEVICE FOR VEHICLE

(71) Applicant: YAZAKI CORPORATION, Tokyo (JP)

(72) Inventors: Etsuhisa Nagasaka, Shizuoka (JP); Harutoshi Nakajima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 286 days.

(21) Appl. No.: 14/332,884

(22) Filed: Jul. 16, 2014

(65) Prior Publication Data

US 2014/0327537 A1 Nov. 6, 2014

Related U.S. Application Data (63) Continuation of application No. PCT/JP2013/059158, filed on Mar. 21, 2013.

(30) Foreign Application Priority Data

Mar. 23, 2012 (JP) .................. 2012-068186

(51) Int. Cl.
*B60K 35/00* (2006.01)
*B60K 37/02* (2006.01)
(Continued)

(52) U.S. Cl.
CPC .............. *B60K 35/00* (2013.01); *B60K 37/02* (2013.01); *B60K 37/06* (2013.01); *G01D 11/28* (2013.01);
(Continued)

(58) Field of Classification Search
CPC ......... B60K 35/00; B60K 37/02; B60K 37/06; G12B 11/00; B60Q 1/00; B60Q 1/26; B60Q 1/06
(Continued)

(56) References Cited

U.S. PATENT DOCUMENTS 5,757,268 A * 5/1998 Toffolo .................. B60K 35/00
340/459
6,009,355 A * 12/1999 Obradovich ....... B60G 17/0195
340/815.4
(Continued)

FOREIGN PATENT DOCUMENTS

DE    10 2006 032 118 A1    1/2008
EP         1 342 605 A1       9/2003
(Continued)

OTHER PUBLICATIONS

Japanese Office Action for the related Japanese Patent Application No. 2012-068186 dated Jan. 5, 2016.
(Continued)

*Primary Examiner* — Hung T Nguyen
(74) *Attorney, Agent, or Firm* — Kenealy Vaidya LLP (57) ABSTRACT

A display device for a vehicle is provided. The display device includes a display that displays, through a display surface thereof, an information image containing various information items; and a partitioning member that is located in front of the display surface of the display. The information image is segmented into regions including a first region and a second region, which have a boundary. The partitioning member extends along the boundary to cover the boundary. The information image includes a presentation image that is moved only in the second region, and the presentation image is moved in a separating direction or an approaching direction relative to the boundary.

6 Claims, 7 Drawing Sheets

(51) Int. Cl.
*B60K 37/06* (2006.01)
*G01D 11/28* (2006.01)
(52) U.S. Cl.
CPC ............... *B60K 2350/1072* (2013.01); *B60K 2350/1096* (2013.01); *B60K 2350/2086* (2013.01); *B60K 2350/2095* (2013.01); *B60K 2350/908* (2013.01); *B60K 2350/928* (2013.01); *B60K 2350/962* (2013.01)
(58) Field of Classification Search
USPC ...... 340/425.5, 438, 461, 462, 691.6, 815.4; 345/115, 127, 129, 131; 701/1, 103; 715/830
See application file for complete search history.

(56) References Cited

U.S. PATENT DOCUMENTS

| | | | |
|---|---|---|---|
| 2004/0070576 A1 | 4/2004 | Sakurai et al. | |
| 2004/0252027 A1* | 12/2004 | Torkkola | G08B 21/06 340/576 |
| 2005/0083187 A1 | 4/2005 | Birman et al. | |
| 2006/0092001 A1 | 5/2006 | Yokota et al. | |
| 2006/0158320 A1 | 7/2006 | Shibata | |
| 2007/0040072 A1 | 2/2007 | Kageyama et al. | |
| 2011/0209092 A1 | 8/2011 | Tarte et al. | |
| 2011/0309924 A1* | 12/2011 | Dybalski | B60K 35/00 340/438 |

FOREIGN PATENT DOCUMENTS

| | | |
|---|---|---|
| JP | 2003-76462 A | 3/2003 |
| JP | 2006-132950 A | 5/2006 |
| JP | 2006-327526 A | 12/2006 |
| JP | 2007-509369 A | 4/2007 |

OTHER PUBLICATIONS

International Search Report and Written Opinion of the International Search Report for PCT/JP2013/059158 dated Dec. 13, 2013.

* cited by examiner

DISPLAY DEVICE FOR VEHICLE

CROSS REFERENCE TO RELATED APPLICATIONS

This application is a continuation of PCT application No. PCT/JP2013/059158, which was filed on Mar. 21, 2013 based on Japanese Patent Application (No. 2012-068186) filed on Mar. 23, 2012, the contents of which are incorporated herein by reference.

BACKGROUND OF THE INVENTION

1. Field of the Invention

The present disclosure relates to a display device for a vehicle.

2. Description of the Related Art

Vehicles have been provided with a display that can display various presentation information in various display styles (see JP-A-2006-132950).

SUMMARY OF THE INVENTION

However, when a large volume of presentation information is displayed in various display styles and as the complexity of the presentation information increases, the burden on the user of perceiving the presentation information increases.

It is an aspect to provide a display device capable of reducing a burden on a user in perceiving presentation information.

A display device for a vehicle according to the present disclosure is configured by any one of the following configurations (1) to (6).

(1) A display device for a vehicle, the display device comprising, a display that displays, through a display surface thereof, an information image containing various information items, and a partitioning member that is located in front of the display surface of the display, wherein the information image is segmented into a plurality of regions including a first region and a second region, which have a boundary therebetween, the partitioning member extends along the boundary to mask the boundary, the information image comprises a presentation image that is moved only in the second region, and the presentation image is moved in at least one of a separating direction and an approaching direction relative to the boundary.

(2) The display device for a vehicle according to the configuration (1), further comprising, an input unit, and a controller connected to the input unit, wherein when the input unit receives an input signal, the controller moves the presentation image in a direction in accordance with the input signal.

(3) The display device for a vehicle according to the configuration (2), wherein the input unit comprises a switch provided on a steering wheel, or in vicinity of the steering wheel, and wherein when the input unit receives an input signal from the switch, the controller moves the presentation image in a direction corresponding to a location of the switch on the steering wheel, or a location of the switch relative to the steering wheel.

(4) The display device for a vehicle according to the configuration (3), wherein an outer shape of the partitioning member is similar to an outer shape of the steering wheel.

(5) The display device for a vehicle according to the configuration (1), further comprising, a communication unit configured to receive an external signal, and a controller connected to the communication unit, wherein when the communication unit receives the external signal, the control unit moves the presentation image in a direction in accordance with the external signal.

(6) The display device for a vehicle according to any one of the configurations (1) to (5), wherein the information image comprises another presentation image that is displayed in the first region.

According to the display device for a vehicle of the configuration (1), the presentation image is moved on the display surface in the separating direction or the approaching direction relative to the boundary. Accordingly, it is visually perceived that an area occupied by the presentation image of the information image is reduced or increased. That is, it is visually perceived that the presentation image slides into the partitioning member or the presentation image slides out from the partitioning member.

In addition, according to the display device for a vehicle of the configuration (1), since the boundary of the display portion and the non-display portion of the presentation image is not visually perceived by a user, the user may to visually perceive the presentation image without an uneasy feeling, and a burden on the user may be reduced when perceiving the presentation information.

According to the display device for a vehicle of the configuration (2), since a moving direction of the presentation image when the presentation image appears or disappears is based on the input performed, the user is able to more easily perceive the presentation image, and a burden on the user is reduced when perceiving the presentation information.

According to the display device for a vehicle of the configuration (3), since a moving direction of the presentation image when the presentation image appears or disappears is based on the location of the switches on the steering wheel or the location of the switches relative to the steering wheel, user is able to more easily perceive the presentation image, and a burden on the user is reduced when perceiving the presentation information.

According to the display device for a vehicle of the configuration (4), the presentation image is moved in the moving direction corresponding to the location of the switch on the steering wheel or the location of the switch relative to the steering wheel. In addition, the outer shape of the partitioning member and the steering wheel are same. Accordingly, when the presentation image is moved by a manipulation of a user, the direction in accordance with the location on the steering wheel of the switch manipulated by a user or the location with respect to the steering wheel of the switch manipulated by a user, corresponds to the moving direction in which the presentation image is moved with respect to the partitioning member having a similar outer shape to the steering wheel.

According to the display device for a vehicle of the configuration (5), when the presentation image is moved with the external signal, the received external signal corresponds to the moving direction of the presentation image on the display surface.

According to the display device for a vehicle of the configuration (6), the presentation image is moved on the display surface in the separating direction or the approaching direction relative to the boundary and the another presentation image. Accordingly, it is visually perceived that an area occupied by the presentation image of the information image is reduced or increased. That is, it is visually perceived that the presentation image slides into the partitioning member and the another presentation image, or the presentation image slides out from the partitioning member and the another presentation image.

In addition, according to the display device for a vehicle of the configuration (6), since the boundary between the presentation image and the another presentation image is not visually perceived by a user, the user may to visually perceive the presentation image without an uneasy feeling, and a burden on the user may be reduced when perceiving the presentation information.

The present disclosure can provide a display device capable of reducing a burden on a user in perceiving presentation information.

As described above, the present disclosure is briefly explained. A detail of the present disclosure will be apparent by reading an exemplary embodiment for carrying out the disclosure as explained later with reference to the accompanying drawings.

BRIEF DESCRIPTION OF THE DRAWINGS

FIGS. 3A to 3C are diagrams showing display contents of a display, in which

DETAILED DESCRIPTION OF THE EXEMPLARY EMBODIMENTS

Hereinafter, exemplary embodiments will be described with reference to the accompanying drawings.

A display device for a vehicle according to exemplary embodiments is used by being mounted on a vehicle such as a car or the like.

Figure 1:
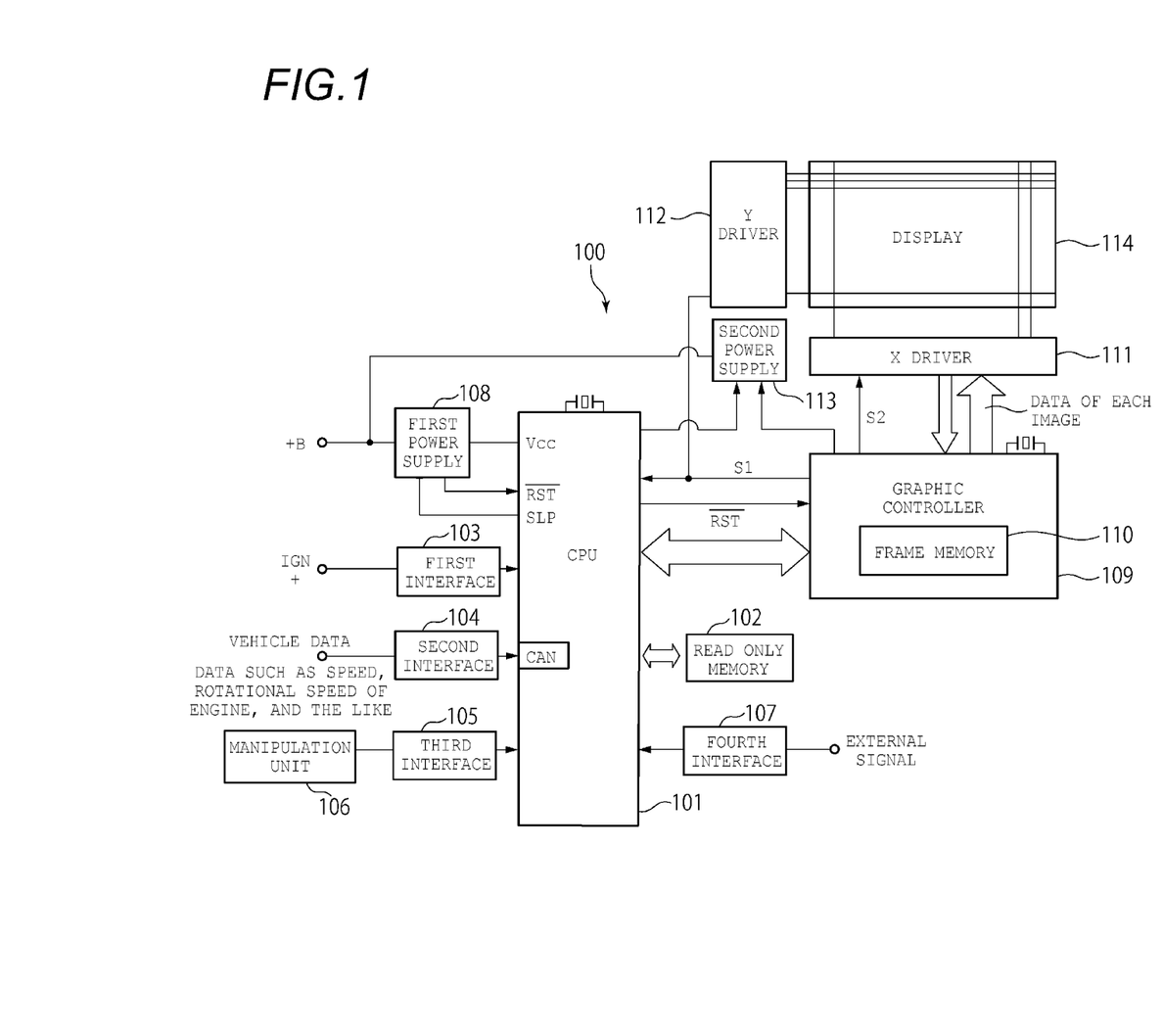
FIG. 1 is a block diagram showing an example of a hardware configuration of a display device for a vehicle according to an exemplary embodiment.

FIG. 1 is a block diagram showing an example of a hardware configuration of a display device for a vehicle according to an exemplary embodiment.

As shown in FIG. 1, the display device 100 for a vehicle includes a controller 101 such as a central processing unit (CPU) or a microcomputer, a read only memory 102 such as an Electrically Erasable Programmable Read Only Memory (EEPROM), a first interface 103, a second interface 104, a third interface 105, a input unit 106, a fourth interface 107, a first power supply 108, a graphic controller 109, a frame memory 110, a X driver 111, a Y driver 112, a second power supply 113, and a display 114 such as a Liquid Crystal Display (LCD) or a Thin Film Transistor LCD (TFT-LCD).

The controller 101 executes a program previously prepared, and performs various processes for realizing a function of the display device 100 for a vehicle. For example, the processes shown in flowcharts of FIGS. 5 to 7 which will be described later are performed by the controller 101.

The read only memory 102 holds contents of a program to be executed by the controller 101, or fixed data previously prepared. For example, image data of a meter image 60 and a presentation image 70 (see FIGS. 4A and 4B), data relating to an initial location of the presentation image 70, data relating to a movement pattern of the presentation image 70, data relating to a terminal location of the presentation image 70, data relating to a removal location of the presentation image 70, and the like are held in the read only memory 102. This data will be described in more detail later.

The interface 103 inputs a signal (IGN+) to the controller 101. The signal IGN+ shows a state of an ignition switch provided in the vehicle on which the display device 100 for a vehicle is mounted.

The second interface 104 is used for performing communication between the controller 101 and various control devices such as an Electric Control Unit (ECU) of the vehicle. In detail, data showing various current vehicle states such as a speed of the vehicle, a rotational speed of an engine, an amount of fuel remaining, a temperature of a coolant, clutch connection or disconnection, and the like is input to the controller 101 through the second interface 104 from the vehicle as almost real-time data.

Figure 2:
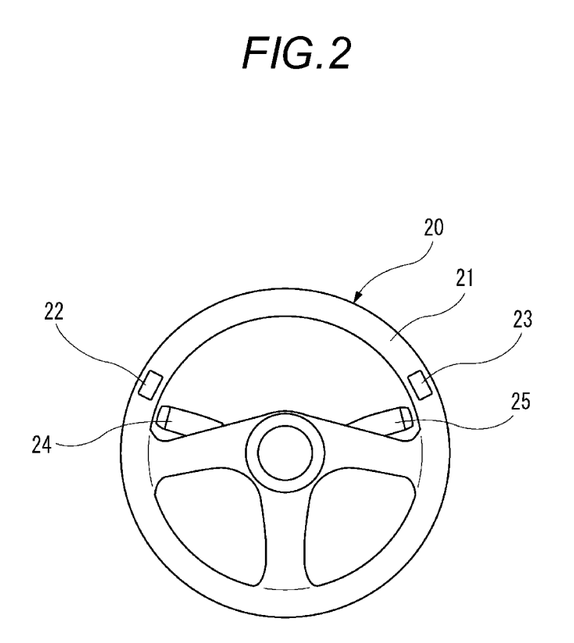
FIG. 2 is a schematic view showing a steering unit of a vehicle including switches for providing input to a display device according to an exemplary embodiment.

The third interface 105 is connected to the controller 101 and inputs a signal received from the input unit 106 to the controller 101. The input unit 106 includes various switches for receiving an input from a user. As shown in FIG. 2, the input unit 106 includes a steering unit 20 as shown in FIG. 2 as a steering gear of the vehicle. The steering unit 20 includes a steering wheel 21 in a substantially annular shape, and further includes a left switch 22 provided on the left side with respect to a rotating axis of the steering wheel 21 and a right switch 23 provided on the right side with respect to the rotating axis of the steering wheel 21. The left switch 22 and the right switch 23 may be pressing type switches, and when pressed, the left switch 22 outputs an input signal L and the right switch 23 outputs an input signal R to the controller 101 through the third interface 105. As will be described later, the left switch 22 and the right switch 23 are used when starting a display start process and when starting a display end process of the presentation image 70.

In addition, the steering unit 20 includes a left lever switch 24 and a right lever switch 25 which are provided on a steering column (not shown) to a rear side of the steering wheel 21. As shown in FIG. 2, the left lever switch 24 and the right lever switch 25 are provided in the vicinity of the steering unit 20. The left lever switch 24 is provided on the left side with respect to the rotating axis of the steering wheel 21, and the right lever switch 25 is provided on the right side with respect to the rotating axis thereof. The left lever switch 24 and the right lever switch 25 are well-known lever switches for manipulating on-board units such as a direction indicator, wipers, and the like. When the left lever switch 24 and the right lever switch 25 are manipulated, an input signal is output to the controller 101 through the third interface 105.

Returning to FIG. 1, the fourth interface 107 (communication unit) is a communication interface connected to the controller 101. The fourth interface 107 inputs an input signal to the controller 101, when the fourth interface 107 receives an external signal received from an external device (not shown). For example, the fourth interface 107 may receive an incoming call signal from a portable terminal. When the fourth interface 107 receives the incoming call signal from the portable terminal, the fourth interface 107 inputs an input signal to the controller 101.

The CPU power supply unit 108 inputs direct current power supplied from a positive side power line (+B) of the vehicle to generate a direct current voltage (Vcc) used for the operation of the controller 101. In addition, the first power supply 108 performs an operation for generating a reset signal to reset the controller 101 in certain circumstances, or to suppress power supply according to a sleep signal to be output from the controller 101.

The display 114 includes a two-dimensional display screen in which a plurality of micro display cells configured of liquid crystal devices are arranged in an X direction and a Y direction. The display may be a color display. Display states of the plurality of micro display cells are controlled individually for each cell to perform graphic display of desired information such as a figure, text, an image, and the like on the two-dimensional display screen.

Figure 3A:
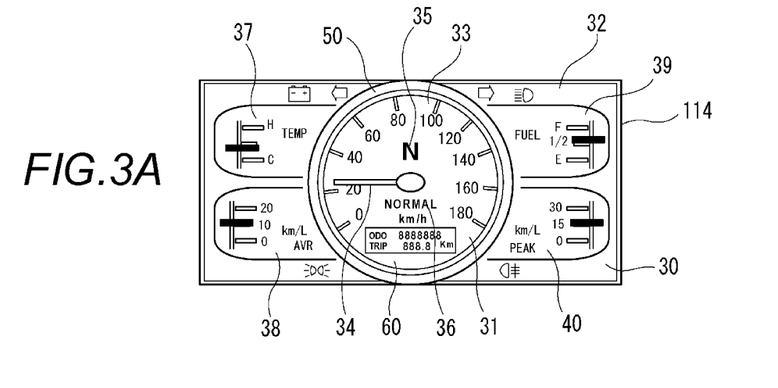
FIG. 3A shows display contents in a normal condition.
Figure 3B:
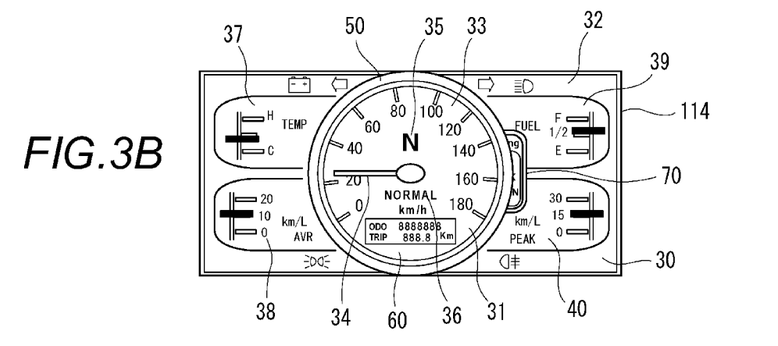
FIG. 3B shows display contents during a time until a presentation image is fixed after starting a display start process of the presentation image.
Figure 3C:
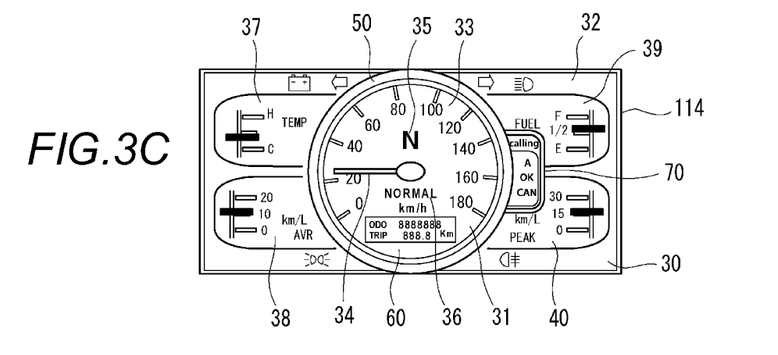
FIG. 3C shows display contents at a time after the presentation image is fixed.
Figure 4A:
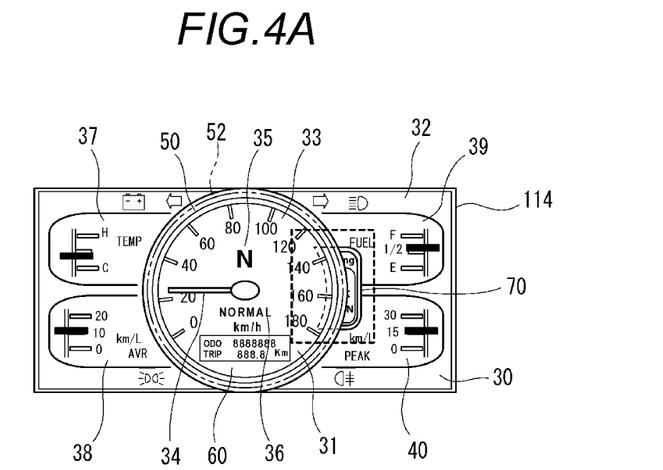
FIG. 4A is an explanatory diagram for explaining a boundary of a first region and a second region, and a relationship between the boundary and a location of a partitioning member.
Figure 4B:
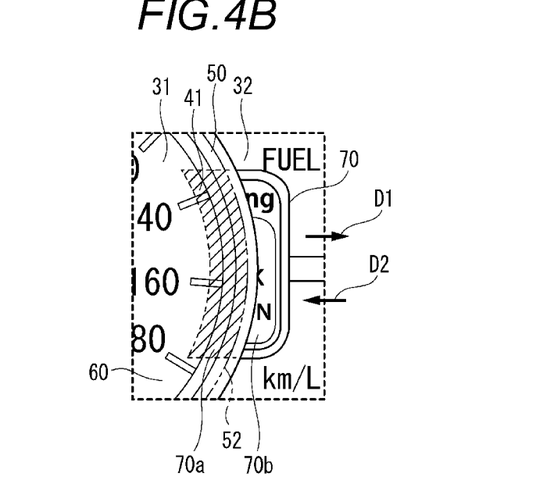
FIG. 4B is a partially enlarged view of FIG. 4A.

FIGS. 3A to 3C are diagrams showing the display contents of the display 114, in which FIG. 3A shows display contents in a normal condition, FIG. 3B shows display contents at a time until a presentation image 70 is fixed after starting a display start process of the presentation image, and FIG. 3C shows display contents at a time after fixing the presentation image 70. FIG. 4A is an explanatory diagram for explaining a boundary and a relationship between the boundary and a location of a partitioning member. FIG. 4B is a partially enlarged view of FIG. 4A.

As shown in FIGS. 3A to 3C, the display 114 displays, through a display surface thereof, an information image 30 which contains various information items, such as the meter image 60 and the presentation image 70. The meter image 60 is another presentation image. Hereinafter, the display contents of the information image 30 of the display 114 will be described in more detail.

Display contents in the normal condition will be described with reference to FIG. 3A. The display 114 displays a graphic display screen by the two-dimensional screen display. A partitioning member 50 is disposed over the display surface of the display 114 as shown in FIGS. 3A to 4B. That is, the partitioning member 50 is located in front of the display surface. The partitioning member 50 is formed of an opaque plastic material, includes a circular opening in the center, and is formed in a substantially annular shape. That is, the partitioning member 50 has an outer shape similar to an outer shape of the steering wheel 21, and forms a movable ring. Schematically, the display 114 displays the information image 30 which has the meter image 60 showing a speed scale 33, an indicator 34, and the like in a first region 31 in a substantially circular shape positioned in the center of the display surface, and images showing a water temperature meter display 37, an average mileage display 38, and fuel display 39, etc. in a second region 32 other than the first region 31 of the display surface. That is, the information image 30 is segmented into the first region 31 and the second region 32. The second region 32 is adjacent to the first region 31. In FIGS. 4A and 4B, the boundary 52 of the first region 31 and the second region 32 is shown with a dashed-two dotted line. As shown in FIGS. 4A and 4B, the partitioning member 50 is disposed so as to be visually perceived by being positioned over the boundary 52 on the display surface of the display 114. In other words, the partitioning member 50 is extended along the boundary 52, and masks the boundary 52. Hereinafter, more detailed display contents of the first region 31 and the second region 32 will be described.

As shown in FIGS. 3A to 4B, the speed scale 33, the indicator 34, a shift indicator 35, and driving mode display 36 are displayed in the first region 31, as the meter image 60. The indicator 34 indicates a part on the speed scale 33 and shows the current speed of the vehicle. The shift indicator 35 shows the current shift range, and the driving mode display 36 shows the current driving mode.

As shown in FIGS. 3A to 4B, the water temperature meter display 37, the average mileage display 38, the fuel display 39, and an instantaneous mileage display 40 are displayed as images in the second region 32 of the information image 30. The water temperature meter display 37 shows the current water temperature of the coolant, the average mileage display 38 shows the current average mileage, the fuel display 39 shows the current remaining amount of the fuel, and the instantaneous mileage display 40 shows the current instantaneous mileage. In addition, the images of the water temperature meter display 37, the average mileage display 38, the fuel display 39, and instantaneous mileage display 40 are also displayed in the second region 32 in the same manner as the first region 31. However, it should be noted that the first region 31 and the second region 32 may be described by omitting some images for easier understanding.

Next, the presentation image 70 will be described. The presentation image 70 is for presenting predetermined information to a user. The presentation image 70 is not displayed in the normal condition as shown in FIG. 3A. As shown in FIGS. 3B and 3C, the presentation image 70 is displayed so as to slide out to the side from the partitioning member 50 according to a display start process of the presentation image which will be described later, and the presentation image 70 is displayed so as to slide into the partitioning member 50 and is removed by being displayed in the reverse order to FIGS. 3B and 3C according to a display end process. In FIGS. 3B and 3C, a case of moving the presentation image 70 in a right direction of these drawings from the partitioning member 50 is shown. However, as will be described later, the presentation image 70 also can be moved in a left direction (not shown) of the drawings in a similar manner as in FIGS. 3B and 3C. The presentation image 70 may also be moved in an up or down direction, and the direction of movement is not particularly limited. A display style of the presentation image 70 will be described later in detail.

Returning to FIG. 1, a scanning location in the Y direction of the display screen of the display 114 is sequentially switched by the Y driver 112. The Y driver 112 sequentially switches the scanning location in the Y direction by synchronizing with a vertical synchronization signal S1 received from the graphic controller 109.

The X driver 111 sequentially switches a scanning location in the X direction of the display screen of the display 114 by synchronizing with a horizontal synchronization signal S2 received from the graphic controller 109. In addition, the X driver 111 gives image data of each color of RGB received from the graphic controller 109 to the display cells of the scanning location to control the display contents in the screen.

The graphic controller 109 displays various graphic elements on the screen of the display 114 according to various commands to be input from the controller 101. In practice, the controller 101 or the graphic controller 109 performs writing of the display data, in conjunction with the frame memory 110 which holds the display contents for each pixel. In addition, the vertical synchronization signal S1 and the horizontal synchronization signal S2 for two-dimensional scanning of the screen of the display 114 are generated, and display data stored in a corresponding address on the frame memory 110 is given to the display 114 at a timing synchronized with the synchronization signals.

The LCD power supply unit 113 receives the direct current power supplied from a positive side power line (+B) of the vehicle and generates a predetermined direct current power for the display 114.

Next, a detailed operation of the display device 100 for a vehicle will be described.

Figure 5:
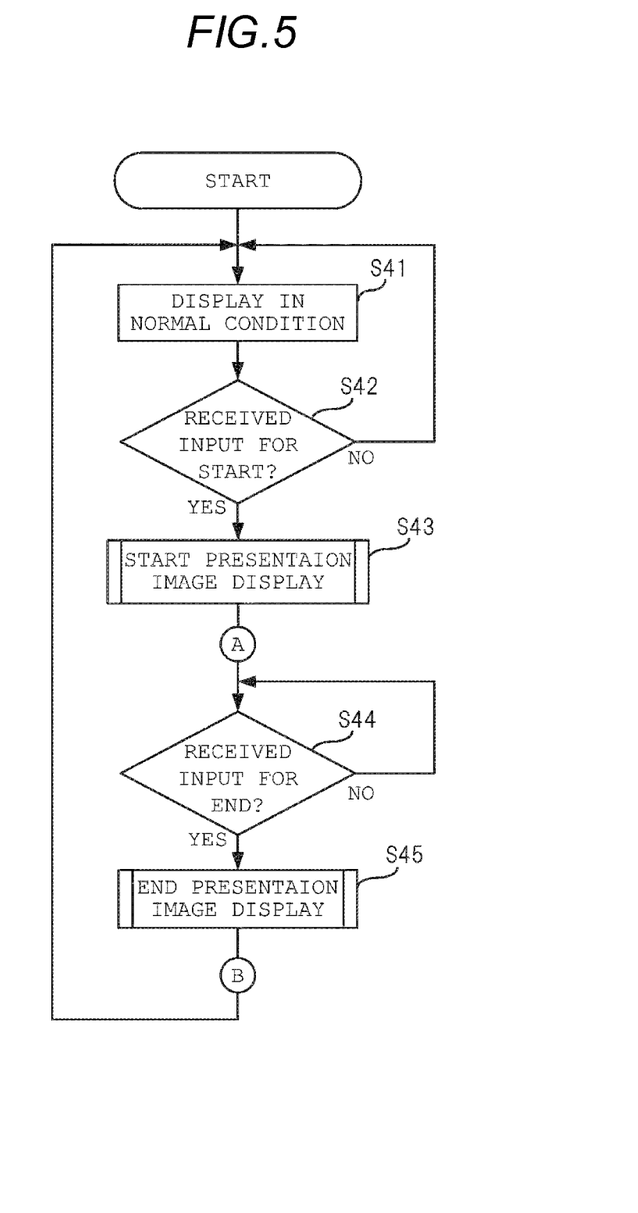
FIG. 5 is a flowchart showing a process after starting displaying with a display device for a vehicle according to an exemplary embodiment.
Figure 6:
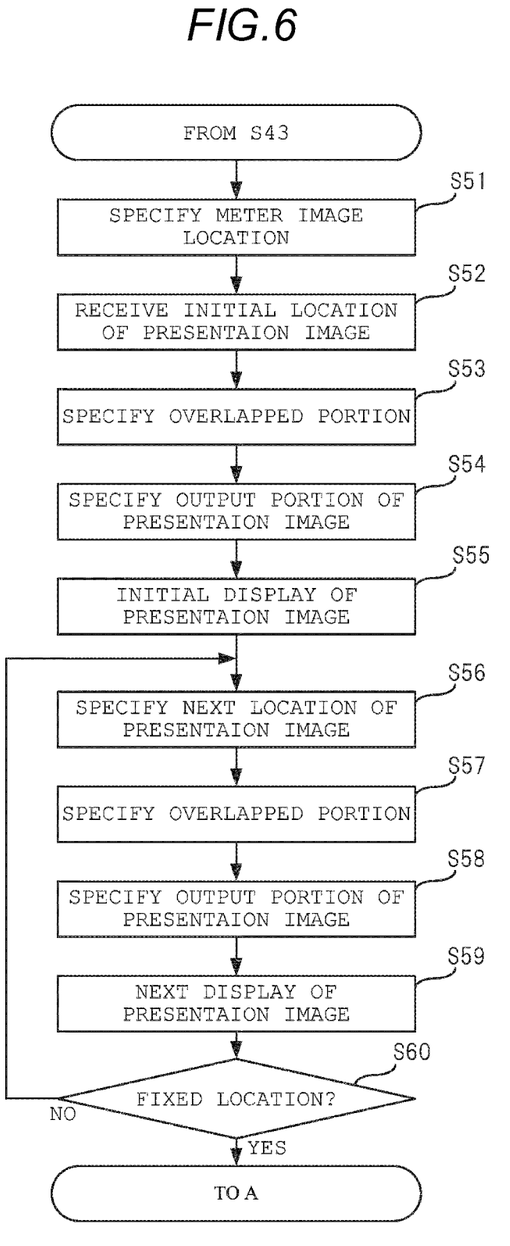
FIG. 6 is a flowchart showing a process of displaying a presentation image after starting the display start process of the presentation image.
Figure 7:
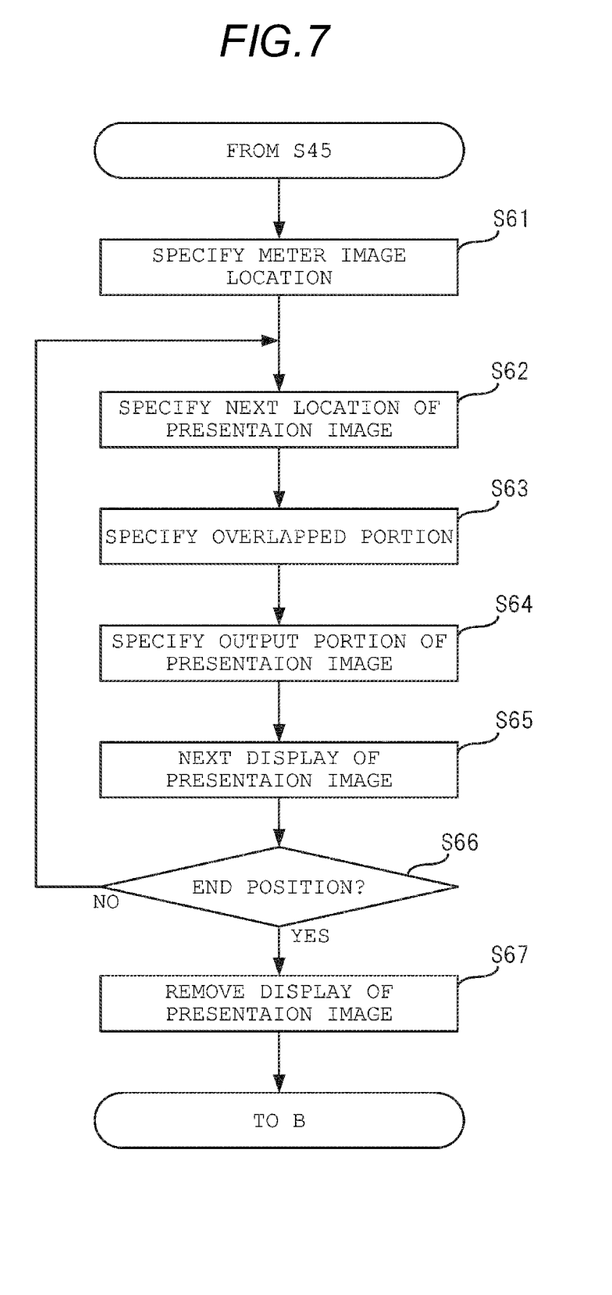
FIG. 7 is a flowchart showing a process of removing the presentation image after starting a display end process of the presentation image.

FIG. 5 is a flowchart showing a process after starting displaying with a display device 100 for a vehicle according to an exemplary embodiment. FIG. 6 is a flowchart showing a process until the presentation image 70 is fixed after starting the display start process of the presentation image. FIG. 7 is a flowchart showing a process until the presentation image 70 is removed after starting the display end process of the presentation image.

First, the process after starting displaying with the display 114 will be described with reference to the flowchart of FIG. 5.

First, a driver turns on the ignition switch. Then, a direct current voltage (Vcc) is supplied to the controller 101, and the controller 101 starts to display information on the display 114.

In operation S41, the controller 101 acquires the image data of the meter image 60 by reading the read only memory 102. After that, as shown in FIG. 3A, the information image 30 in the normal condition is output to the display 114 based on the acquired data.

In operation S42, the controller 101 waits for an input signal for starting the display start process of the presentation image. In detail, the controller 101 determines the states of the left switch 22 and the right switch 23. In this exemplary embodiment, the display start process of the presentation image starts when one of the input signal L from the left switch 22 or the input signal R from the right switch 23 is received by the controller 101. Accordingly, as a result of the determination of operation S42, when it is determined that the input signal L or the input signal R is received, the process of operation S43 is executed and the display start process of the presentation image starts. On the other hand, in the determination of operation S42, when it is determined that the input signal L or the input signal R is not received, the operation S41 is executed again.

In operation S43, the controller 101 executes the display start process of the presentation image. The display start process of operation S43 will be described in detail later.

In operation S44, the controller 101 waits for an input signal for starting the display end process of the presentation image. In detail, the controller 101 determines the states of the left switch 22 and the right switch 23. In this exemplary embodiment, the display end process of the presentation image starts when the same input signal as the input signal received when starting the display start process in operation S42 is received. That is, when the display start process is started by receiving the input signal L in operation S42, the display end process also starts by receiving the input signal L in operation S44 and does not start with the input signal R. As a result of the determination of operation S44, when it is determined that the input signal L or the input signal R for starting the display end process is received, the process of operation S45 is executed and the display end process of the presentation image starts. On the other hand, in the determination of the operation S44, when it is determined that the input signal L or the input signal R for starting the display end process is not received, the operation S44 is executed again.

In operation S45, the controller 101 executes the display end process of the presentation image. The display end process of the operation S45 will be described in detail later.

Next, the process until fixing the presentation image 70 after starting the display start process of the presentation image will be described in detail, with reference to the flowchart of FIG. 6. In operation S42, when the input signal R from the right switch 23 is received as the input signal for starting the display start process, the presentation image 70 is moved in the right direction from the partitioning member 50, as shown in FIGS. 3B and 3C. On the other hand, when the input signal L from the left switch 22 is received, the presentation image 70 is moved in the left direction from the partitioning member 50. That is, the presentation image 70 is moved in a different direction depending on the types of the input signal received in operation S42. Hereinafter, in operation S42, the display start process in a case of receiving the input signal R from the right switch 23 as the input signal for starting the display start process of the presentation image will be described.

In the display start process shown in FIG. 6, processes of operation S51 to operation S55 are processes for displaying the presentation image 70 on an initial location after starting the display start process. Processes of operation S56 to operation S60 are processes executed after operation S55, and are repeatedly executed until a display location of the presentation image 70 reaches a terminal location which is a location where the movement of the presentation image 70 is stopped.

An initial display process occurring in operation S51 to operation S55 will be described.

In operation S51, the controller 101 receives a signal containing information about the display location of the meter image 60 from the display 114. Accordingly, the display location on the display surface of the meter image 60 is specified. In addition, hereinafter, a case in which the display location of the meter image 60 does not change will be described in this exemplary embodiment. However, in a case in which the display location of the meter image 60 changes with time, the location of the partitioning member 50 may be changed according to the display location of the meter image 60.

In operation S52, the controller 101 reads out data relating to the initial location of the presentation image 70 from the read only memory 102. The controller 101 reads out data relating to the initial location in accordance with the input signal received in operation S42 of FIG. 5. When the input signal R is received in operation S42, the data relating to the initial location in a case of moving the presentation image 70 in the right direction is read out. Accordingly, the initial display location on the display surface of the presentation image 70 is specified. In this exemplary embodiment, as the initial display location, the location is set in which the entire presentation image 70 is positioned in the first region 31 where the meter image 60 is displayed. However, the presentation image 70 is not displayed in the position in which the entire presentation image 70 is positioned in the first region 31. Thus, the display appears in the same manner as in the normal condition shown in FIG. 3A. Accordingly, the presentation image 70 is moved from the non-displayed state so as to gradually expand a display area to be displayed in the display surface.

In operation S53, the controller 101 specifies an overlapped portion 41 which is a portion where the meter image 60 and the presentation image 70 of the display region are overlapped with each other, based on the display location of the meter image 60 received in operation S51 and the initial location of the presentation image 70 received in operation S52. As described above, in this exemplary embodiment, the entire presentation image 70 is positioned in the first region 31 in the initial location. Accordingly, the entire presentation image 70 becomes the overlapped portion 41 in the initial location.

In operation S54, the controller 101 specifies an output portion of the presentation image 70 to be displayed onto the display surface, based on the overlapped portion 41 specified in operation S53. In this exemplary embodiment, a first portion 70a of the presentation image 70 positioned in the first region 31 is not displayed and a second portion 70b of the presentation image 70 positioned in the second region 32 is displayed. That is, the presentation image 70 is moved only in the second region 32. In addition, the first portion 70a accords with the overlapped portion 41. That is, in operation S54, the controller 101 specifies the second portion 70b of the presentation image 70 which is a portion other than the overlapped portion 41. In the exemplary embodiment described above, the entire presentation image 70 is positioned in the first region 31 in the initial location. Accordingly, there is no second portion 70b in the initial location.

In operation S55, the controller 101 sets the first portion 70a of the presentation image 70 which is a portion other than the second portion 70b specified in operation S54, as a non-display portion in the initial location received in operation S42, and displays the second portion 70b as a display portion. Accordingly, only the second portion 70b is displayed to be able to be visually perceived by a user on the display surface of the display 114. In the exemplary embodiment described above, the entire presentation image 70 is positioned in the first region 31 in the initial location. Accordingly, since there is no second portion 70b in the initial location, the entire presentation image 70 is not displayed.

Hereinabove, the process performed until the presentation image 70 is displayed in the initial location has been described.

Hereinafter, a process when the presentation image 70 is moved on the display surface from the initial location to the terminal location will be described.

In operation S56, the controller 101 reads out data relating to the movement pattern of the presentation image 70 from the read only memory 102. A movement locus or a movement speed when the presentation image 70 is moved from the initial location to the terminal location is specified based on the data relating to the movement pattern. For example, the movement pattern may be set to move linearly from the initial location to the terminal location at a predetermined constant speed. In operation S56, the controller 101 specifies a next display location of the presentation image 70 with reference to the data of the movement pattern.

In operation S57, the controller 101 specifies the overlapped portion 41 based on the display location of the meter image 60 received in operation S51 and the next display location of the presentation image 70 received in operation S56. FIGS. 4A and 4B are diagrams exemplifying the display contents during the time the presentation image 70 is being moved to the terminal location from the initial location. In FIG. 4B, the overlapped portion 41 is shown with a hatched line.

In operation S58, the controller 101 specifies the second portion 70b of the presentation image 70 which is the portion other than the overlapped portion 41, based on the overlapped portion 41 specified in operation S57.

In operation S59, the presentation image 70 is displayed at the next display location specified in operation S56, with the second portion 70b specified in operation S58 as the display portion. Accordingly, as shown in FIG. 4B, the presentation image 70 is moved in a direction D1 away from the meter image 60, the partitioning member 50 and the boundary 52.

In operation S60, the controller 101 reads out data relating to the terminal location of the presentation image 70 from the read only memory 102. After that, the controller 101 determines whether or not the current display location of the presentation image 70 has reached the terminal location. As a result of the determination, in a case where it is determined that the display location has not reached the terminal location, the controller 101 returns to operation S56 again. On the other hand, as a result of the determination, in a case where it is determined that the display location has reached the terminal location, the controller 101 ends the display start process of the presentation image. That is, after ending the display start process, the movement of the presentation image 70 is stopped and the presentation image 70 is fixedly displayed at the terminal location. For example, to the terminal location may be a position in which the entire presentation image 70 is displayed in the second region 32 as shown in FIG. 3C.

With the process described above, the presentation image 70 is moved from the initial location to the terminal location, and is moved in a separating direction so as to be separated from the meter image 60, the partitioning member 50 and the boundary 52. Accordingly, the presentation image 70 is visually perceived as sliding out from the meter image 60 and the partitioning member 50. That is, the presentation image 70 is visually perceived as moving only in the second region 32. In addition, the boundary 52 of the first portion 70a that is not to be displayed on the display surface and the second portion 70b of the presentation image 70 that is to be displayed is masked by the partitioning member 50. In other words, the boundary 52 between the meter image 60 and the second portion 70b is covered by the partitioning member 50. Accordingly, the boundary 52 is not visually perceived by a user.

In addition, in operation S42, the display start process in a case of receiving the input signal R from the right switch 23, as the input signal for starting the display start process of the presentation image has been described. However, a similar process may also be executed for the display start process in a case of receiving the input signal L from the left switch 22. In that case, in operation S52, data relating to the initial location in a case of moving the presentation image 70 in the left direction is read out. In addition, in operation S56, data relating to a movement pattern in a case of moving the presentation image 70 in the left direction is referred to. Further, in operation S60, a terminal location in a case of moving the presentation image 70 in the left direction is read out. As a result, when the input unit 106 which includes the left switch 22 and the right switch 23 receives the input signal L or the input signal R, the controller 101 moves the presentation image 70 in the left direction or the right direction, respectively, in accordance with the input signal received by the input unit 106. In other words, when the input unit 106 receives the input signal L or the input signal R from the left switch 22 or the right switch 23, the controller 101 moves the presentation image 70 in a direction corresponding to the location of the left switch 22 relative to the steering wheel 21 or the location of the right switch 23 relative to the steering wheel 21.

Next, a process for removing the presentation image 70 performed after starting the display end process of the presentation image will be described with reference to the flowchart of FIG. 7. Referring back to FIG. 5, in operation S42, a case of receiving the input signal R from the right switch 23 as the input signal for starting the display start process of the presentation image has been described. As described above, in this exemplary embodiment, the display end process of the presentation image starts when the same input signal as the input signal received when starting the display start process in operation S42 is received. Accordingly, in operation S44, the display end process in a case of receiving the input signal R as the input signal for starting the display end process is described. At that time, the presentation image 70 is moved in the left direction to a removing location from the terminal location shown in FIG. 3C and then, the display thereof is stopped. The removing location is a location to stop the display of the presentation image 70. As a result, the presentation image 70 is displayed so as to slide into the partitioning member 50 and removed. At the time of starting the display end process of the presentation image, the presentation image 70 is displayed at the terminal location.

Turning to FIG. 7, in operation S61, the controller 101 receives the display location of the meter image 60 from the display 114.

In operation S62, the controller 101 reads out the data relating to the movement pattern of the presentation image 70 from the read only memory 102, and specifies the next display location of the presentation image 70 by referring to the data of the movement pattern.

In operation S63, the controller 101 specifies the overlapped portion 41 based on the display location of the meter image 60 received in operation S61, and the display location of the presentation image 70 received in operation S62.

In operation S64, the controller 101 specifies the second portion 70b of the presentation image 70 which is the portion other than the overlapped portion 41, based on the overlapped portion 41 specified in operation S63.

In operation S65, the second portion 70b of the presentation image 70 specified in operation S64 is displayed to the next display location specified in operation S62, as the display portion. Accordingly, as shown in FIG. 4B, the presentation image 70 is moved in a direction D2 approaching the meter image 60, the partitioning member 50 and the boundary 52.

In operation S66, the controller 101 reads out the data relating to the removing location of the presentation image 70 from the read only memory 102. After that, the controller 101 determines whether or not the current display location of the presentation image 70 has reached the removing location. As a result of the determination, in a case where it is determined that the display location has not reached the removing location, the controller 101 returns to operation S62. On the other hand, as a result of the determination, in a case where it is determined that the display location has reached the removing location, the controller 101 proceeds to operation S67. The removing location in which the display of the presentation image 70 stops may be set as a location where the presentation image 70 is not displayed. For example, the removing location may be the same as the initial location used in the initial display process. Alternatively, the removing location may be a different location than the initial location. In this exemplary embodiment, the removing location is configured to be the same as the initial location.

In operation S67, the controller 101 stops the display of the presentation image 70 to the display 114. Accordingly, the presentation image 70 is removed from the display 114.

By the process described above, the presentation image 70 is moved from the terminal location to the removing location, and is moved in the approaching direction so as to approach to the meter image 60, the partitioning member 50 and the boundary 52. That is, the presentation image 70 is visually perceived as sliding into the meter image 60 and the partitioning member 50.

In the above display end process, a case of receiving the input signal R from the right switch 23 as the input signal for starting the display end process of the presentation image has been described. However, the process may also be executed for the display end process in a case of receiving the input signal L from the left switch 22.

Modified Example 1

Modified Example 1 of the display device 100 for a vehicle according to an exemplary embodiment will now be described. In Modified Example 1, instead of the left switch 22 and the right switch 23 provided on the steering wheel 21, the input is received from the left lever switch 24 and the right lever switch 25 provided with the steering unit 20. The left lever switch 24 and the right lever switch 25 are provided in a vicinity of the steering wheel 21, as shown in FIG. 2. Since the other configurations are the same as the exemplary embodiment described above, the detail description thereof will be omitted.

In the display device 100 for a vehicle according to Modified Example 1, when the controller 101 receives the input signal L or the input signal R from the left lever switch 24 or the right lever switch 25, respectively, the controller 101 executes the display start process and the display end process of the presentation image. At that time, the information which is presented by the presentation image 70 may be the same as the presentation information of the exemplary embodiment described above, or may be independent presentation items corresponding to the left lever switch 24 and the right lever switch 25. For example, the presentation information may be information relating to turning on and off of the direction indicator which is switched with the lever switches. That is, in the Modified Example 1, when the input unit 106 which includes the left lever switch 24 and the right lever switch 25 receives the input signal L or the input signal R from the switches, the controller 101 moves the presentation image 70 in a direction in corresponding to a location of the left lever switch 24 with respect to the steering wheel 21 (e.g., in a left-hand direction), or a location of the right lever switch 25 with respect to the steering wheel 21 (e.g., in a right-hand direction).

Modified Example 2

Modified Example 2 of the display device 100 for a vehicle according to an exemplary embodiment will be described. In Modified Example 2, instead of the input signal from the left switch 22 or the right switch 23 provided on the steering unit 20, the display start process and the display end process of the presentation image are executed based on an external signal received by the fourth interface 107. At that time, the presentation image 70 is moved in a direction specified based on the received external signal. For example, the presentation image 70 may be moved to the right in a case where the fourth interface 107 receives an incoming call signal as the external signal from a portable terminal, and the presentation image 70 may be moved to the left in a case where the fourth interface 107 receives an incoming mail signal as the external signal from the portable terminal. That is, the presentation image 70 of Modified Example 2 presents that there is an incoming call from a portable terminal, to a user as the presentation information. Since the other configurations are the same as the exemplary embodiment described above, the detail description thereof will be omitted.

In a case of receiving the incoming call signal, for example, the presentation image 70 may be moved to the right, as shown in FIG. 3C. At that time, the presentation image 70 shows that there is an incoming call with text "calling" displayed on the upper portion of the presentation image 70, and with text "A" displayed on the lower portion of the text to indicate the caller of the call (i.e., in this case the caller is "A"). In addition, the display 114 may be configured as a two-dimensional screen display comprising a touch panel which can receive an input due to a touch of a finger or stylus to the display 114. In such a case, the presentation image 70 displays text "OK" or "CAN" as touch buttons below the text "A". A user can start receiving the call by pressing the "OK" button, and can refuse the call by pressing the "CAN" button. That is, in the Modified Example 2, when the fourth interface 107 receives an incoming call signal or an incoming mail signal as the external signal from the portable terminal, the controller 101 moves the presentation image 70 in a direction in accordance with the external signal.

Hereinafter, a function and an advantageous effect of the display device 100 for a vehicle according to the embodiment will be described.

The display device 100 for a vehicle includes the display 114 that displays, through the display surface thereof, the information image 30 containing various information items. The display device 100 for a vehicle further includes the partitioning member 50 that is located in front of the display surface of the display 114. The information image 30 is segmented into the first region 31 and the second region 32, which have the boundary 52 therebetween. The partitioning member 50 is extended along the boundary 52 to mask the boundary 52. The information image 30 has the presentation image 70 that is moved only in the second region 32. The presentation image 70 is moved in the separating direction D1 or the approaching direction D2 relative to the boundary 52.

Accordingly, the presentation image 70 is moved on the display surface in the separating direction D1 or the approaching direction D2 relative to the boundary 52. Accordingly, it is visually perceived that the presentation image 70 is moved in the separating direction D1 or the approaching direction D2 with respect to the partitioning member 50, and it is visually perceived that an area occupied by the presentation image 70 of the information image 30 is reduced or increased. That is, it is visually perceived that the presentation image 70 slides into the partitioning member 50 or the presentation image 70 slides out from the partitioning member 50.

According to the exemplary embodiments, the appearance and the disappearance of the presentation image 70 from the display surface is shown for a user with the sliding movement of the presentation image 70 on the display surface with respect to the partitioning member 50. Accordingly, a user can easily perceive the presentation image 70.

In addition, as described above, the boundary 52 of the first portion 70a of the presentation image 70 not to be displayed and the second portion 70b thereof to be displayed is masked by the movable ring 50. Thus, the boundary 52 is not visually perceived by a user.

According to the exemplary embodiments, since the boundary 52 of the display portion and the non-display portion of the presentation image 70 is not visually perceived by a user, the user may to visually perceive the presentation image 70 without an uneasy feeling, and a burden on the user may be reduced when perceiving the presentation information.

In addition, the display device 100 for a vehicle further includes the input unit 106, and the controller 101 connected to the input unit 106. When the input unit 106 receives the input signal L or the input signal R, the controller 101 moves the presentation image 70 in the left direction or the right direction in accordance with the input signal L or the input signal R.

Accordingly, when the presentation image 70 is moved by the manipulation of a user, the manipulation of a user corresponds to the moving direction of the presentation image 70 on the display surface.

According to the exemplary embodiments, since a moving direction of the presentation image 70 when the presentation image 70 appears or disappears is based on the input performed, the user is able to more easily perceive the presentation image 70, and a burden on the user is reduced when perceiving the presentation information.

In addition, the input unit 106 includes the left switch 22 and the right switch 23 provided on the steering wheel 21, and the left lever switch 24 and the right lever switch 25 provided in the vicinity of the steering wheel 21. When the input unit 106 receives the input signal L or the input signal R from the left switch 22 or the right switch 23, the controller 101 moves the presentation image 70 in the left direction or the right direction in accordance with the location of the left switch 22 and the right switch 23 on the steering unit 20. When the manipulation unit 106 receives the input signal L or the input signal R from the left lever switch 24 or the right lever switch 25, the controller 101 moves the presentation image 70 in the left direction or the right direction in accordance with the location of the left switch 22 and the right switch 23 relative to the steering unit 20.

Accordingly, the presentation image 70 is moved in the left direction or the right direction in accordance with the location of the switches on the steering wheel 21 or the location of the switches relative to the steering wheel 21. Accordingly, when the presentation image 70 is moved by a manipulation of a user, the manipulation of a user corresponds to the moving direction of the presentation image.

According to the exemplary embodiments, since a moving direction of the presentation image 70 when the presentation image 70 appears or disappears is based on the location of the switches on the steering wheel 21 or the location of the switches relative to the steering wheel 21, user is able to more easily perceive the presentation image 70, and a burden on the user is reduced when perceiving the presentation information.

In addition, the outer shape of the partitioning member 50 is the same as an outer shape of the steering wheel 21.

Accordingly, the presentation image 70 is moved in the left direction or the right direction corresponding to the location of the left switch 22 and the right switch 23 on the steering wheel 21 or the location of the left lever switch 24 and the right lever switch 25 relative to the steering wheel 21. In addition, the outer shapes of the partitioning member 50 and the steering wheel 21 are same. Accordingly, when the presentation image 70 is moved by a manipulation of a user, the direction in accordance with the location on the steering wheel 21 of the switches manipulated by a user or the location relative to the steering wheel 21 of the switches manipulated by a user, corresponds to the moving direction in which the presentation image 70 is moved with respect to the partitioning member 50 having the outer shape similar to the outer shape of the steering wheel 21.

According to the exemplary embodiments, since a user can intuitively grasp the moving direction of the presentation image 70 when the presentation image 70 appears or disappears based on the location of the switches on the steering wheel 21, or the location of the switches with respect to the steering wheel 21, the user may more easily perceive the presentation image 70, and a burden on the user may be reduced when perceiving the presentation information.

In addition, the display device 100 for a vehicle further includes the interface 107 (communication unit) that configured to receive the external signal. When the interface 107 receives the external signal, the controller 101 moves the presentation image 70 in the direction in accordance with the external signal.

Thus, when the presentation image 70 is moved with the external signal, the received external signal corresponds to the moving direction of the presentation image on the display surface.

According to exemplary embodiments, since a user can intuitively grasp the moving direction of the presentation image 70 when the presentation image 70 appears or disappears, based on an external signal, the user may more easily perceive the presentation image 70, and a burden on the user is reduced when perceiving the presentation information.

In addition, the presentation image 30 had the meter image 60 (another presentation image) that is displayed in the first region 31.

Accordingly, the presentation image 70 is moved on the display surface in the separating direction D1 or the approaching direction D2 relative to the meter image 60 displayed to the first region 31 and the partitioning member 50, and the first portion 70a of the presentation image 70 which is positioned in the first region 31 is not displayed and the second portion 70b of the presentation image 70 which is positioned in the second region 32 is displayed. Thus, it is visually perceived that the presentation image 70 is moved in the separating direction D1 or the approaching direction D2 relative to the meter image 60 displayed to the first region 31 and the partitioning member 50, and it is visually perceived that the area occupied by the second portion 70b of the presentation image 70 is reduced or increased. That is, it is visually perceived that the presentation image 70 slides into the meter image 60 and the partitioning member 50 or the presentation image 70 slides out of the meter image 60 and the partitioning member 50.

As a result, the appearance and the disappearance of the presentation image 70 from the display surface is shown for a user with the sliding movement of the presentation image 70 on the display surface with respect to the partitioning member 50 and the meter image 60. Accordingly, a user can easily perceive the presentation image 70.

In addition, according to the display device 100 for a vehicle according to the embodiment, the boundary 52 of the meter image 60 and the second portion 70b is masked by the partitioning member 50. Thus, the boundary 52 is not visually perceived by a user. As a result, since the boundary 52 between images is not visually perceived by a user, so the user may to visually perceive the presentation image without an uneasy feeling, and a burden on the user may be reduced when perceiving the presentation information.

The present inventive concept is not limited to the above-described exemplary embodiments, and modifications and alterations may be made to the exemplary embodiments without departing from the spirit of the present inventive concept. For example, materials, sizes, shapes, numbers, and locations of components may be changed and are not particularly limited.

For example, as described above, the presentation image 70 is configured to be movable in two directions, i.e., a left direction and a right direction with respect to the partitioning member 50. However, the presentation image 70 may be movable in at least one of the left direction and the right direction, or may be configured to be movable in a vertical direction, or may be configured to be movable in another direction other than the vertical direction, or may be configured to be movable in more than two directions. For example, the presentation image 70 may be configured to be moved in an upper left direction with respect to the partitioning member 50 by assuming that the left switch 22 shown in FIG. 2 is disposed on an upper left portion of the steering unit 20. In addition, for example, the presentation image 70 may be configured to be moved in vertical and horizontal directions based on an input signal from each switch which is disposed on the upper, lower, left, and/or right portions of the steering unit 20.

As described above, an initial display location of the presentation image 70 is set to position the entire presentation image 70 in the first region 31 to be in a location where the presentation image 70 is not displayed. However, a part of the presentation image 70 may be located in the first region 31, and another part may be located outside of the first region 31. Similar modifications can also be made for the terminal location and the removing location.

As described above, the display device is configured to display over the entire surface of the display 114. However, an analog-type display may be configured for the display portion other than the portion where the presentation image 70 is displayed. For example, instead of the meter image 60 displayed in the first region 31, a rotary indication type speedometer may be included in the first region 31, and the presentation image 70 may be moved so as to slide into or slide out from the speedometer.

As described above, the presentation image 70 is moved in a direction approaching or separating with respect to the partitioning member 50. However, the presentation image 70 may be moved with respect to a decorative ring which is not movable, other than the partitioning member 50, or the presentation image 70 may be configured to be moved with respect to a partitioning portion which defines a boundary of screen display. In addition, as described above, the partitioning member 50 is configured to have a substantially annular shape. However, any shape can be employed.

As described above, the data of the presentation image 70 is held in the read only memory 102, the overlapped portion 41 of the presentation image 70 and the first region 31 is specified, and the display portion of the presentation image 70 is determined according to the overlapped portion 41 to perform the display process. However, a plurality of data items of the presentation image 70 according to the display locations may be previously held in the read only memory 102, and the data items of the presentation image 70 corresponding to the display locations of the presentation image 70 may be read out from the read only memory 102 to perform the display process of the presentation image 70.

As describe above, the boundary 52 is a line portion which is located between the first region 31 and the second region 32. However, the boundary may be configured as a band portion which has a band shape with a predetermined width.

According to the display device for a vehicle described above, it is possible to provide a display device capable of reducing a burden on a user in perceiving presentation information.

What is claimed is:

1. A display device for a vehicle, the display device comprising:
    a display that displays, through a display surface thereof, an information image containing various information items; and
    a partitioning member that is located in front of the display surface of the display, wherein:
    the information image is segmented into a plurality of regions including a first region and a second region, which have a boundary therebetween,
    the partitioning member extends along the boundary to mask the boundary,
    the information image comprises a presentation image which is configured to be movable from an initial non-display position in the first region to a terminal display position in the second region, and
    the presentation image is configured to be movable in at least one of a separating direction to slide out to the side from the first region to be displayed and an approaching direction to slide into the first region to be removed such that the presentation image is moved only in the second region.

2. The display device for a vehicle according to claim 1, further comprising:
    an input unit; and
    a controller connected to the input unit,
    wherein when the input unit receives an input signal, the controller moves the presentation image in a direction in accordance with the input signal.

3. The display device for a vehicle according to claim 2, wherein
    the input unit comprises a switch provided on a steering wheel, or in vicinity of the steering wheel, and
    wherein when the input unit receives an input signal from the switch, the controller moves the presentation image in a direction corresponding to a location of the switch on the steering wheel, or a location of the switch relative to the steering wheel.

4. The display device for a vehicle according to claim 3, wherein an outer shape of the partitioning member is similar to an outer shape of the steering wheel.

5. The display device for a vehicle according to claim 1, further comprising:
    a communication unit configured to receive an external signal; and
    a controller connected to the communication unit,
    wherein when the communication unit receives the external signal, the control unit moves the presentation image in a direction in accordance with the external signal.

6. The display device for a vehicle according to claim 1, wherein the information image comprises another presentation image that is displayed in the first region.

* * * * *